United States Patent
Crump et al.

(10) Patent No.: US 6,581,175 B1
(45) Date of Patent: Jun. 17, 2003

(54) APPARATUS AND METHOD OF REQUESTING RETRANSMISSION OF A MESSAGE ACROSS A NETWORK

(75) Inventors: Richard Crump, Boston, MA (US); Janet Doong, Chelmsford, MA (US); Xiangrong Cai, Billerica, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/472,668

(22) Filed: Dec. 27, 1999

Related U.S. Application Data (60) Provisional application No. 60/141,310, filed on Jun. 29, 1999.

(51) Int. Cl.[7] .................................................. H04L 1/16
(52) U.S. Cl. ......................................................... 714/748
(58) Field of Search ................................. 714/748, 749, 714/18; 709/230

(56) References Cited

U.S. PATENT DOCUMENTS

| | | | | |
|---|---|---|---|---|
| 5,541,927 A | * | 7/1996 | Kristol et al. ............... | 370/256 |
| 5,619,689 A | * | 4/1997 | Kelly .......................... | 707/201 |
| 5,701,427 A | * | 12/1997 | Lathrop ....................... | 709/203 |
| 5,727,002 A | * | 3/1998 | Miller et al. ................ | 709/237 |
| 5,754,754 A | * | 5/1998 | Dudley et al. ................ | 714/18 |
| 5,905,871 A | * | 5/1999 | Buskens et al. ............. | 709/238 |
| 5,961,659 A | * | 10/1999 | Benner ........................ | 710/52 |
| 5,974,028 A | * | 10/1999 | Ramakrishnan ............. | 370/229 |
| 6,067,567 A | * | 5/2000 | Bartfai et al. ............... | 709/221 |
| 6,115,749 A | * | 9/2000 | Golestani et al. ........... | 370/229 |
| 6,122,275 A | * | 9/2000 | Karol et al. ................. | 370/389 |
| 6,151,696 A | * | 11/2000 | Miller et al. ................ | 714/748 |
| 6,247,059 B1 | * | 6/2001 | Johnson et al. ............. | 370/390 |
| 6,269,080 B1 | * | 7/2001 | Kumar ......................... | 370/236 |
| 6,335,933 B1 | * | 1/2002 | Mallory ....................... | 370/394 |
| 6,392,993 B1 | * | 5/2002 | Hamilton et al. ........... | 370/230 |

* cited by examiner

*Primary Examiner*—Stephen M. Baker
(74) *Attorney, Agent, or Firm*—Steubing McGuinness & Manaras LLP (57) ABSTRACT

An apparatus and method of requesting retransmission of at least a portion of a message (having a plurality of message segments) from a sender utilizes message units in a memory device for storing data relating to retransmit messages. In particular, each message unit in the memory has data for one message segment. To that end, a retransmit message requesting retransmission of a set of message segments to a given receiver is received from the given receiver. The given retransmit message then is parsed to determine both the identity of the given receiver, and the identity of the set of message segments requested by the given receiver. A message unit then is produced in the memory for each of the set of message segments that does not have an existing message unit in memory. Data representing the identity of the given receiver then is added to all message units for the set of message segments.

66 Claims, 7 Drawing Sheets

FIG. 6

APPARATUS AND METHOD OF REQUESTING RETRANSMISSION OF A MESSAGE ACROSS A NETWORK

PRIORITY

This application claims priority from U.S. provisional patent application serial No. 60/141,310, filed Jun. 29, 1999, entitled, "APPARATUS AND METHOD FOR AGGREGATING AND SEGMENTING NEGATIVE ACKNOWLEDGMENT MESSAGES" and bearing attorney docket number 2204/171, the disclosure of which is incorporated herein, in its entirety, by reference.

FIELD OF THE INVENTION

The invention generally relates to computer networks and, more particularly, the invention relates to an apparatus and method of requesting retransmission of a message across a network.

BACKGROUND OF THE INVENTION

Various data transport protocols specify that upon receipt of a given message across a network, a receiving network device ("receiver") may transmit a positive acknowledgment message to a sending network device ("sender") to acknowledge that the given message was successfully received. In addition, upon detecting that a given message was not successfully received, such protocols often also specify that the receiver is to transmit a negative acknowledgment message to the sender to acknowledge that the given message was not successfully received. Upon receipt of a negative acknowledgment message, the sender may take some action, such as re-transmitting the given message to the receiver. Use of such protocols improves the reliability of data transmissions across a network, such as the Internet.

One such protocol that utilizes positive and negative acknowledgment messages is known as the Pragmatic General Multicast protocol ("PGM"), which is utilized to specify data transport for multicast transmissions. As known in the art, multicasting is a well-known method of transmitting messages to selected groups of users across a network. In accord with the PGM specification, a single PGM multicast message typically comprises a plurality of message segments that each are identified by a sequence number. For example, a given message from a sender to a receiver may include message segments ranging from sequence number one to sequence number twelve.

PGM utilizes two types of negative acknowledgment messages ("NAKS"), namely single NAKS and range NAKS. A single NAK identifies a single message segment (of a specific message) that was not received by the receiver, while a range NAK identifies a range of message segments (of a specific message) that were not received by the receiver. For example, a single NAK for the above exemplary message may indicate that message segment number five was not received. As another example, an exemplary range NAK for such exemplary message may indicate that message segments five through nine were not received by the receiver.

A network element between the sender and the receiver typically stores received NAKS in memory. Accordingly, newly received NAKS are compared against NAKS in memory to check for overlapping ranges. For example, a newly received range NAK for message segments four and five may be checked against the above noted range NAK (i.e., the range NAK for message segments five through nine). In a similar manner, when a confirmation message from a sender is received by the network element (i.e., confirming that a NAK was received by the sender), the network element also must check against the NAKS in memory for overlapping ranges. Furthermore, upon receipt of a message segment from a sender, the network element again must check the memory to determine which NAKS request retransmission of the received message segment. Moreover, the network element also maintains a listing of each receiver and their associated NAKS.

This process of repeatedly comparing and determining which sender requested which message segments places a large computational burden on the network element. In addition, NAKS having overlapping message segment ranges for the same receiver commonly are transmitted, thus unnecessarily adding data traffic to the network.

SUMMARY OF THE INVENTION

In accordance with one aspect of the invention, an apparatus and method of requesting retransmission of at least a portion of a message (having a plurality of message segments) from a sender utilizes message units in a memory device for storing data relating to retransmit messages. In particular, each message unit in the memory has data for one message segment. To that end, a given retransmit message requesting retransmission of a set of message segments to a given receiver is received from the given receiver. The given retransmit message then is parsed to determine both the identity of the given receiver, and the identity of the set of message segments requested by the given receiver. A message unit then is produced in the memory for each of the set of message segments that does not have an existing message unit in memory. Data representing the identity of the given receiver then is added to all message units for the set of message segments.

In preferred embodiments, each message unit is identified by an identifier, and each message unit is indexed based upon the identifier of its associated message segment. The message units in memory may form a queue, or some other structure. The message initially may be transmitted in accord with a data transport protocol that utilizes negative acknowledgment messages. The set of message segments may include a plurality of message segments, or one message segment.

In some embodiments, it is determined if the sender has forwarded a confirmation message indicating its receipt of a retransmit message relating to each of the set of message segments. If determined that the sender has not forwarded the confirmation message for at least one of the set of segments, then a new retransmit message is forwarded to the sender. The new retransmit message includes data relating to the at least one of the set of message segments. The new retransmit message may be aggregated with data relating to a plurality of message segments in the set of message segments.

In accordance with another aspect of the invention, an apparatus and method of requesting retransmission of a portion of a message having a plurality of message segments (that each are identified by a sequence identifier) indexes message units based upon the sequence identifiers. Prior to requesting retransmission, the message initially is transmitted toward a given receiver by a sender via an acknowledgment data transport protocol that requests retransmission of message segments. To that end, a retransmit message requesting retransmission of a plurality of missing message segments is received from the given receiver. The retransmit message then is segmented to add message segment data to a plurality of message units. Each message unit includes data for no more than one of the plurality of message segments. As noted above, the message units consequently are indexed based upon the sequence identifiers. The message segments are accessible by their sequence identifiers.

In some embodiments of this aspect of the invention, a given message unit having data relating to a given message segment is accessed. It then is determined, based upon the data in the given message unit, if the sender has forwarded a given confirmation message that indicates its receipt of a retransmit message relating to the given message segment. A new retransmit message requesting retransmission of the given message segment may be forwarded to the sender if it is determined that the sender has not forwarded the given confirmation message.

In accordance with another aspect of the invention, a method of re-transmitting a segmented message initially transmitted toward a given receiver by a sender via an acknowledgment data transport protocol (that requests retransmission of missing message segments) first receives a retransmit message from the receiver. The retransmit message requests retransmission of a set of message segments. A set of message units relating to the set of message units then are accessed. Each message unit in the set of message units includes data for no more than one of the set of message segments. A message unit is produced for each message segment in the set of message segments that does not have an existing message unit in the set of message units. All of the message segments are stored in a memory device (i.e., a distributed or single memory device). A new retransmit message is generated based upon the data in the message units in the memory device. The new retransmit message includes a request to retransmit a plurality of the message segments in the set of message segments. The new retransmit message then is forwarded to the sender.

The new retransmit message may be generated by accessing each message unit to determine if the sender forwarded a confirmation message. A confirmation message for a given message unit indicates receipt by the sender of a retransmit message relating to the message segment associated with the given message unit. Identification data then may be added to the new retransmit data. The identification data identifies each message segment with an associated message unit that does not have confirmation received data. The confirmation received data is in each message unit that received a confirmation message.

Preferred embodiments of the invention are implemented in hardware, or as a computer program product having a computer usable medium with computer readable program code thereon. The computer readable code may be read and utilized by the computer system in accordance with conventional processes.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

Figure 1:
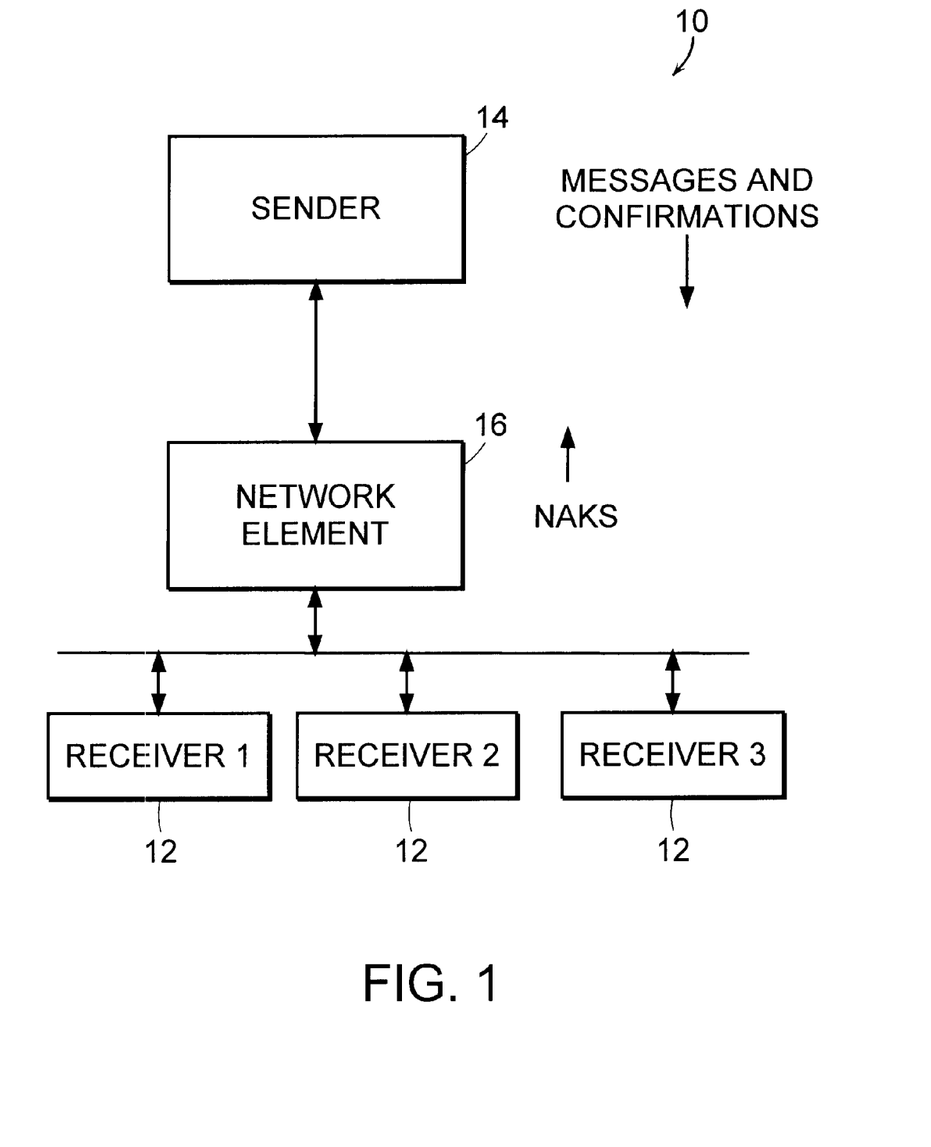
FIG. 1 schematically shows a preferred network arrangement that may be utilized to as implement preferred embodiments of the invention.

FIG. 1 schematically shows a simplified network arrangement that may be utilized to implement preferred embodiments of the invention. In particular, FIG. 1 shows a network 10 of various network devices, including three receiving network devices ("receivers 12"), a sending network device ("sender 14"), and a network element 16 between the sender 14 and receivers 12. The receivers 12, sender 14, and network element 16 may be any network device known in the art, such as a router or network switch. For example, such devices may include an ACCELAR™ router, available from Nortel Networks Corporation of Ontario, Canada. Each of the network devices shown in FIG. 1 therefore may be a part of another network, such as a local area network, and/or the Internet. Accordingly, each such network device may include one or more client computers (not shown) that initiate and/or receive data transmission.

In preferred embodiments, the sender 14 transmits multicast messages to various combinations of the receivers 12 in accord with the well known Pragmatic General Multicast protocol ("PGM"). Accordingly, negative acknowledgment messages ("NAKs") are transmitted from the receivers 12 to the sender 14, as necessary. Furthermore, confirmation messages indicating that NAKs were received by the sender 14, and general data messages ("messages") are transmitted from the sender 14 to the receivers 12 via the network element 16.

As known by those skilled in the art, messages transmitted as specified by PGM comprises a plurality of message segments that together form an entire message. Each message segment is identified by a message segment identifier that identifies the location of the message segment within the whole message. Since they identify message segment locations, the segment identifiers are referred to as "sequence numbers." For example, a given message may comprise first through ninth message segments having respective first through ninth sequence numbers. Accordingly, the first message segment is before the second message segment, and the second message segment is before the third message segment, etc . . . until the ninth message segment, which concludes the entire message.

In accord with the PGM protocol, the sender 14 may not be the actual originator of the message being transmitted to the receiver(s) 12. For example, the sender 14 may receive the message from another upstream sender. Accordingly, in such case, the sender 14 acts as a network element 16 to the upstream sender. In a similar manner, the receivers 12 may not be the ultimate recipients of a message. Accordingly, in such case, each receiver 12 may act as a network element to an ultimate downstream receiver that is to receive and consume the message.

It should be noted that although preferred embodiments of the invention are described in terms of PGM, principles of preferred embodiments may be applied to other multicast protocols that utilize acknowledgment messages (negative or positive). Moreover, principles of preferred embodiments may be applied to non-multicast data transport protocols that utilize acknowledgment messages. Accordingly, discussion of preferred embodiments in terms of PGM and multicasting is by example only and not intended to limit the scope of the invention.

In accordance with preferred embodiments of the invention, NAKs received by the network element 16 are segmented so that NAK data is stored based upon message segment identifiers and not based upon NAKs. Stated another way, data parsed from a received NAK is indexed to message segment identifiers (i.e., sequence numbers). To that end, memory structures referred to herein as "message units" are generated and stored in a memory device as a queue to store message segment data relating to NAKs. Each memory unit includes data for no more than one message segment in the message. Details of message units and their role in requesting message segment retransmission are discussed in detail below.

Figure 2:
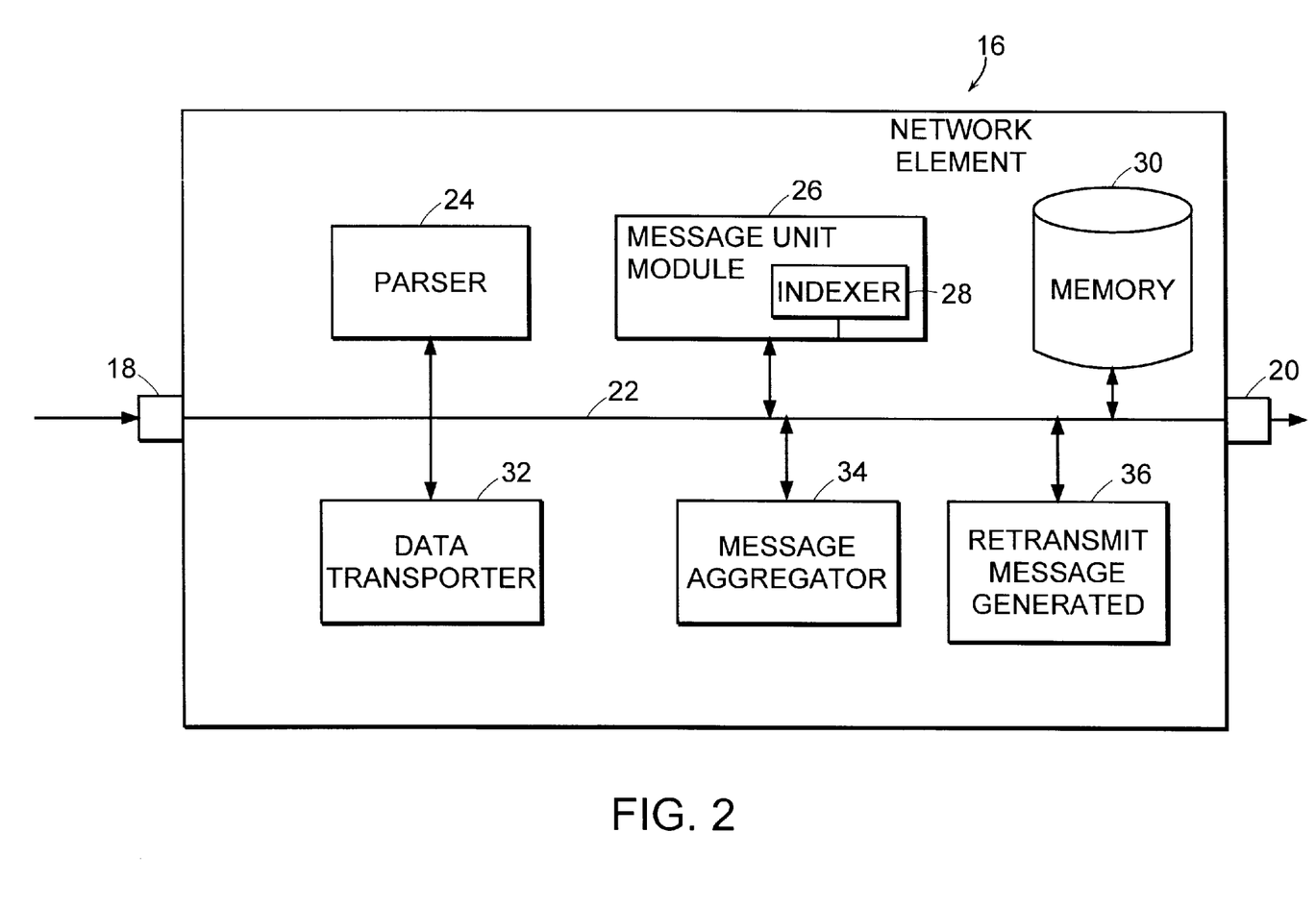
FIG. 2 schematically shows an exemplary network element having various functional modules utilized to implement preferred embodiments of the invention.

FIG. 2 schematically shows an exemplary network element 16 having various functional modules utilized to implement preferred embodiments of the invention. As noted below, the functional modules may be implemented in either or both of hardware and software.
The network element 16 comprises an input 18 for receiving data from the network 10, and an output 20 for transmitting data to the network 10. Among other things, the input 18 and output 20 may be the same physical interface for receiving and transmitting data, or may be distributed among many physical and virtual interfaces. The network element 16 also includes a bus 22 for coupling each of the functional modules, and the following modules:

- a parser 24 for parsing received NAKs (i.e., retransmit messages) from the receiver 12 requesting retransmission of one or more message segments;
- a message unit module 26 (with indexer 28) that produces message units and indexes them based upon the message segment identifiers;
- memory 30 for storing message units;
- a data transporter 32 for adding parsed data from received retransmission messages to message units;
- a message aggregator 34 that aggregates retransmit messages; and
- a retransmit message generator 36 that produces retransmit messages for transmission to the sender 14.

The interaction of each of these functional modules is discussed below with reference to FIGS. 3 to 6.

Figure 3:
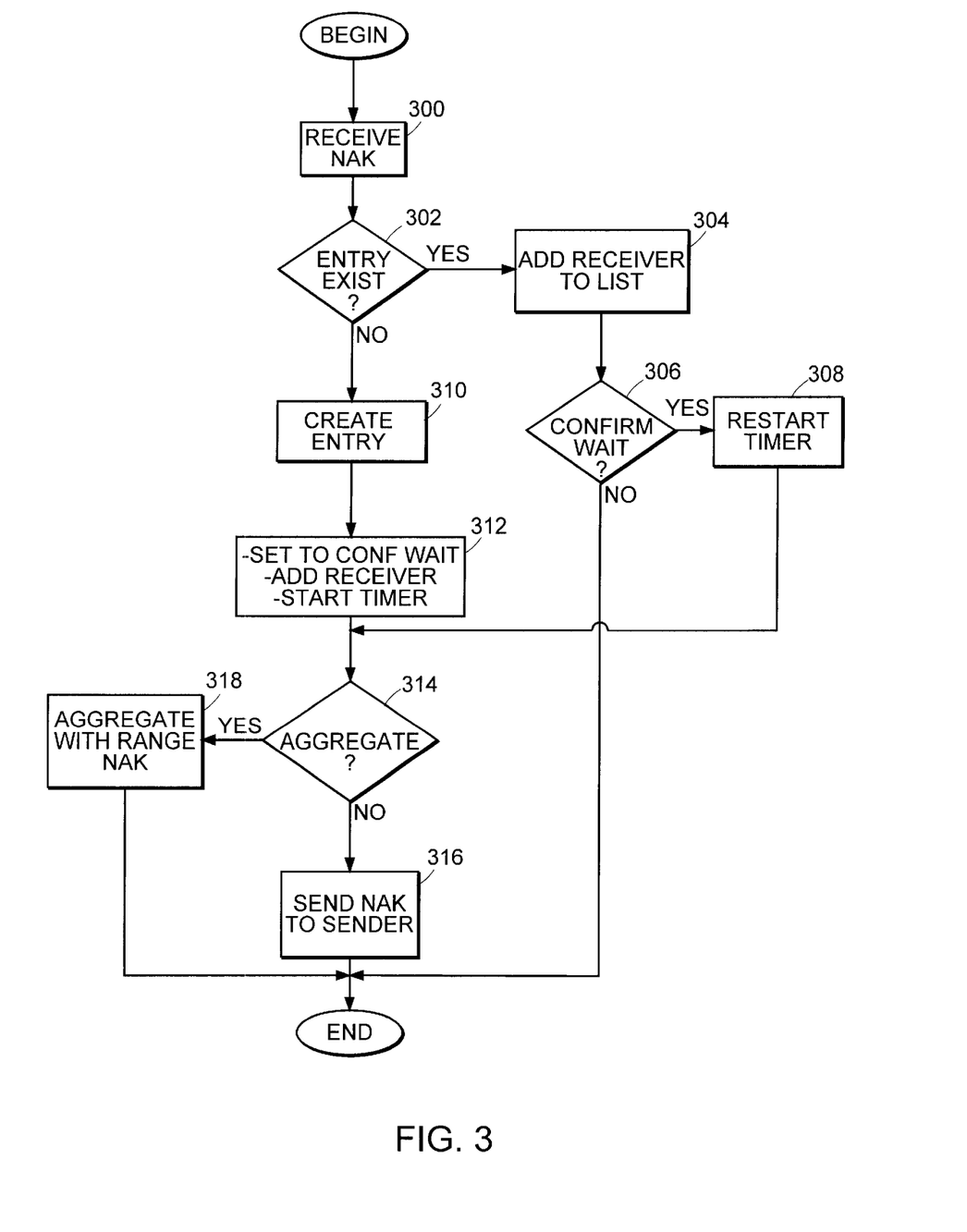
FIG. 3 shows a preferred process utilized by the network element shown in FIG. 2 for processing single NAKs.

FIG. 3 shows a preferred process utilized by the network element 16 for processing single NAKs, which request retransmission of one given message segment. The process begins at step 300 in which a single NAK is received by the given network element 16. As known by those skilled in the art, the single NAK includes the sequence number of the given message segment that is to be retransmitted by the sender 14, and an identifier identifying the receiver 12 requesting retransmission. The process continues to step 302 in which it is determined if an entry in a memory structure within the memory 30 exists for the given message segment. For example, as noted above, the memory 30 preferably includes a queue of message units for each message. Each message unit includes data for no more than one message segment, and is indexed (i.e., identified) by the sequence number of its message segment. Accordingly, it is determined at step 302 if the memory 30 includes a message unit for the given message segment. To that end, a search is performed, based upon the given message segment sequence number, to determine if such message unit exists. Specifically, a simple one to one search for a message unit having the sequence number is conducted.

Figure 4A:
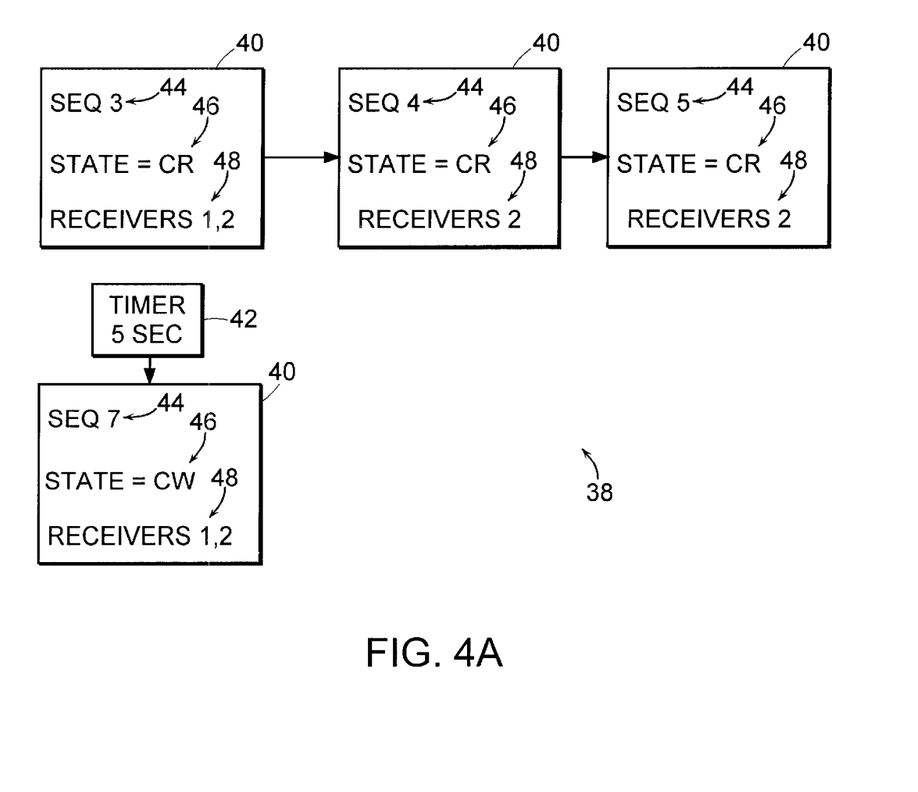
FIG. 4A shows an exemplary four message unit queue for a single message.
Figure 4B:
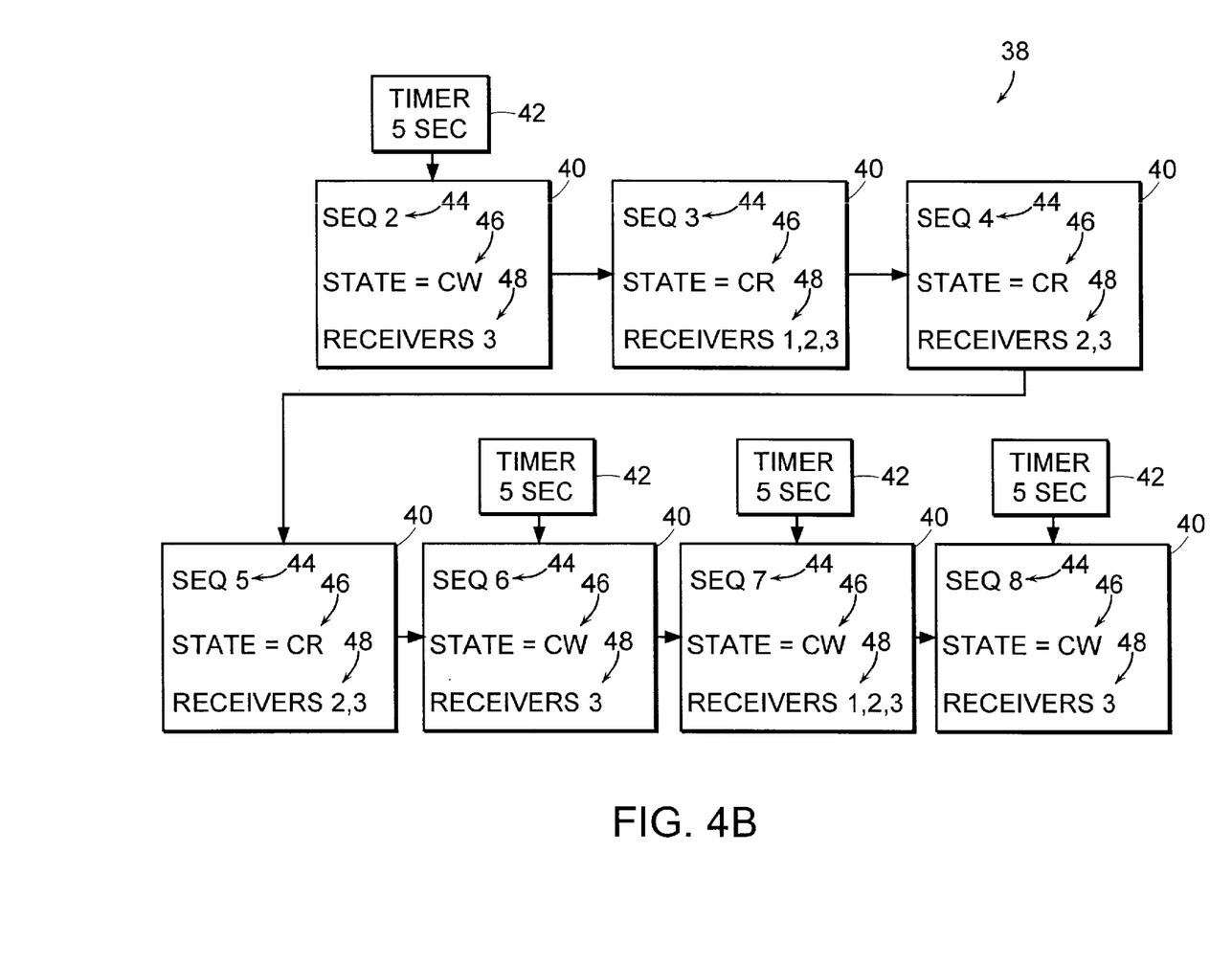
FIG. 4B shows an exemplary seven message unit queue for a single message.

FIG. 4A shows an exemplary four message unit queue 38 for a single message. FIG. 4B shows a subsequent seven message unit queue 38 for the same single message upon receipt of a range NAK (discussed below as an example). Among other data, each message unit (referred to hereinafter as "message unit 40") includes the following data:

- a NAK timer 42 indicating the total amount of time remaining before another NAK is to be retransmitted to the sender;
- a sequence number field 44 identifying the sequence number of the message segment and thus, the sequence number of the message unit 40;
- a state indicator 46 indicating whether the message unit 40 is in a "confirmation wait" state (i.e., indicating that the message unit 40 is waiting for a confirmation message from the sender 14, where such confirmation message indicates that the sender 14 has received the NAK for the specified message unit 40), or in a "confirmation received" state (i.e., indicating that a confirmation message from the sender 14 has been received, thus indicating that the sender 14 has received the NAK and will retransmit the specified message in due course); and
- a receiver list 48 that lists each receiver 12 that has requested retransmission of the specified message unit 40.

Details of use of the queues 38 in memory 30 are discussed in greater detail below.

Returning to step 302 in the process of FIG. 3, if it is determined that an entry does in fact exist for the given message segment (i.e., if it is determined that a message unit 40 in memory 30 exists for the given message segment), then the process continues to step 304 in which the data transporter 32 adds the identity of the receiver 12 to the receiver list 48 for the located message unit 40. The process then continues to step 306, in which it is determined if the message unit 40 is in the confirmation wait state. If in the confirmation wait state, then the NAK timer 42 is set to restart upon transmission of a NAK to the sender 14 for this message unit 40 (step 308). The process then continues to step 314, the details of which are discussed below. Conversely, if it is determined at step 306 that the message unit 40 was not in the confirmation wait state (i.e., it is in the confirmation received state), then the process ends. It should be noted that the process ends in this case since the sender 14 already has acknowledged receipt of a NAK requesting retransmission of the message segment.

Returning again to step 302, if it is determined that an entry does not exist for the given segment, then the process continues to step 310, in which an entry (i.e., a new message unit 40) is added (i.e., generated, or initialized) to the queue 38 for the given message segment. Once initialized, the new message unit 40 is set to the confirmation wait state, the identity of the receiver 12 is added to a receiver list 48, and the timer 42 is set to start in preparation of transmission of a NAK to the sender 14 (step 312).

In a manner similar to step 308, the process then continues to step 314, in which the aggregator determines if the NAK data for the given message unit 40 can be aggregated with other NAK data for transmission to the sender 14 as a single NAK. To that end, the aggregator preferably determines if a message unit 40 exists for the message segments immediately preceding and succeeding the given message segment.

For example, if the given message segment is message sequence number ten, then the aggregator determines if a message unit 40 exists for message segments nine and eleven.

If a message unit 40 exists for either of such adjacent message segments, then it is determined if such message unit 40 is in the confirmation wait state. If in such state, then the data for the given message segment may be aggregated with such message unit 40 data as discussed below with reference to FIG. 5. Accordingly, if the aggregator determines that the message unit 40 may be aggregated, then such data is aggregated at step 318, thus completing the process. Conversely, returning to step 314, if it is determined that the data in the message unit 40 cannot be aggregated, then the process continues to step 316, in which a NAK for the given message segment is forwarded to the sender 14. Of course, the NAK timer 42 is set or reset (as noted above), as the case may be, when the NAK is transmitted, thus completing the process.

Figure 5:
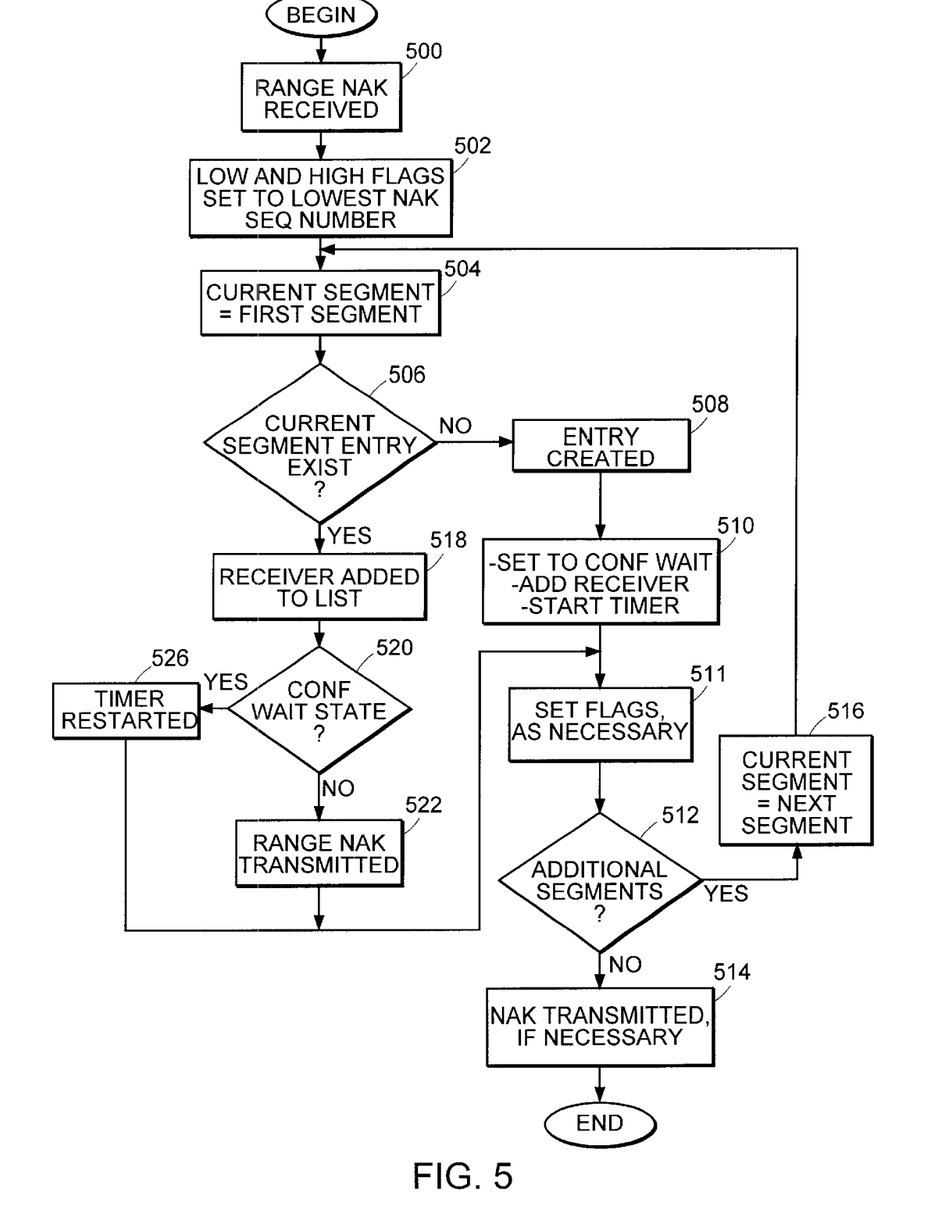
FIG. 5 shows a preferred process of segmenting range NAKs, and then aggregating them with data from other NAKs to forward NAK data to the sender.

Preferred embodiments also may be applied to range NAKs. In summary, range NAKs are segmented and their data added to a queue 38 of message units 40 in memory 30. FIG. 5 shows a preferred process of segmenting range NAKs, and then aggregating them with data from other NAKs to forward NAK data to the sender 14. The process begins at step 500 in which a range NAK is received by the network element 16. As discussed above and known in the art, the range NAK includes a request to retransmit two or more specified message segments of a specified message. The range NAK also includes information identifying the receiver 12 requesting retransmission.

Once received, the process continues to step 502, in which a low flag and a high flag both are set to the lowest NAK sequence number in the range NAK. As shown below, the low and high flags are the boundaries for transmitting a range NAK to the sender 14. For example, if the low flag is set to two and the high flag is set to five at the end of the process, then a range NAK for message segments two through five will be transmitted to the sender 14. If the low and high flags are set to the same number, then a single NAK is transmitted for the message segment having the same number. In addition, if the low and high flags are set to a null value, then no NAK is transmitted. The process thus continues to step 504, in which a variable "current segment" is set to be the message segment in the range NAK having the lowest sequence number.

It then is determined at step 506 if an entry (i.e., a message unit 40) in the memory 30 exists for the current segment. As noted above when discussing FIG. 3, such entry is determined by indexing based upon the sequence number of the current segment. If no such entry exists, then the process continues to step 508, in which a message unit 40 is initialized for the current segment. The process then continues to step 510, in which the newly initialized message unit 40 is set to the confirmation wait state, the identity of the receiver 12 that transmitted the NAK is added to a receiver list 48, and the timer 42 is set to start upon transmission of a NAK to the sender 14. The high and low flags then are set, if necessary (step 511).

It then is determined at step 512 if the range NAK includes data for any additional message segments. If no such additional segments exist, then the process continues to step 514, in which a NAK is transmitted, as necessary. Of course, a single NAK is transmitted if the high and low flags are set to the same sequence number, while a range NAK is transmitted if the high and low flags are not the same sequence number. No NAK is transmitted if either flag is set to a null value.

Conversely, if it is determined at step 512 that additional NAKs do exist, then the process continues to step 516, in which the current segment variable is set to be the next message segment. The process then loops back to step 506, in which it is determined if a current segment entry exists. Accordingly, returning to step 506, if it is determined that the memory 30 includes a message unit 40 for the current segment, then the process continues to step 518, in which the identity of the receiver 12 that transmitted the NAK is added to the receiver list 48.

It then is determined at step 520 if the message unit 40 of the current segment is in the confirmation wait state. If not in such state (i.e., it is in the confirmation received state), then the process continues to step 522, in which a NAK is transmitted to the sender 14. To that end, the low flag value and high flag values are ascertained, and information relating to the message segments having sequence numbers within the range defined by those flags is transmitted to the sender 14 via a NAK. Once the NAK is transmitted and the respective timers 42 are reset, the flags are reset to a null value (at step 511), and the process continues to step 512 (discussed above).

Returning to step 520, if it is determined that the message unit 40 for the current segment is in the confirmation wait state, then the process continues to step 526, in which the timer 42 is set to restart when it is detected that a NAK is transmitted (if necessary) including data for the current segment. The process then loops to step 511, in which the high flag is set to the sequence number of the current segment. The process then continues to step 512, and continues executing as discussed above.

By way of example, the process shown in FIG. 5 may be executed for a range NAK from receiver three for message segments having sequence numbers two through eight. The queue 38 shown in FIG. 4A is the queue 38 before the range NAK is received, while the queue 38 shown in FIG. 4B is the queue 38 after the received range NAK is processed. The process therefore begins at step 500 where the range NAK is received. The low and high flags are set to two (i.e., the lowest sequence number in the range NAK) at step 502, and message segment number two is the current segment (step 504). A new message unit 40 is created for the first message segment (step 508) because no entry exists for that message segment. The timer 42 is set to five seconds, while the state is set to confirm wait and the identity of receiver three is added to the receiver list 48 (step 510). Since the flags have already been set (step 511) and there are additional segments (step 512), the process then sets the current segment to be the third segment (step 516) and the process returns to step 506 to determine if an entry exists for the third segment. Since an entry exists for this message segment, the identity of receiver three is added to the receiver list 48 in the third message unit 40 (step 518). In addition, since such message unit 40 is in confirmation received state, then a NAK is transmitted. To that end, the flags are checked and, since both are set to two, a single NAK for message segment two is transmitted to the sender 14. The flags then are reset to a null value (step 511), and the current message segment is set to be the fourth segment (step 516).

Since an entry exists for message segment four, the identity of the third receiver is added to the receiver list 48. The fourth message unit 40 is in the confirmation received state and thus, a NAK is transmitted, if necessary. In this case, no NAK is transmitted since no other message units 40 are aggregated with this message segment, and the sender 14 already has acknowledged that it has received a NAK for this message segment. Accordingly, the current segment is set to be the fifth message segment. Processing continues for the fifth message segment in the same manner as with the fourth message segment. Accordingly, the sixth message segment is set to be the current segment.

Since no entry exists for the sixth message segment (step 506), a sixth message unit 40 is generated at step 508. Once generated, its timer 42 is set, the identity of the third receiver is added to the receiver list 48, and its state indicator 46 is set to the confirmation wait state (step 510). The low and high flags then are set to have a value of six (step 511), and the current segment is set to be the seventh message segment (step 516). Since an entry exists for the seventh message segment, the identity of the third receiver is added to the receiver list 48 (step 518). In addition, since the seventh message unit 40 is in the confirmation wait state, the timer 42 is restarted (step 526) and the high flag is set to a value of seven (step 511).

The current segment variable then is set to the eighth message segment (step 516). Since no entry exists for the eighth message segment (step 506), an eighth message unit 40 is created, which is set to confirmation wait state. Its timer 42 also is set to five seconds, and the third receiver is added to the receiver list 48 (step 510). Once the eighth message unit 40 is initialized, the high flag then is set to a value of eight (step 511). It then is determined at step 512 that no additional segments exist. Accordingly, the low and high flags are checked to determine which, if any, message units 40 are to have data included in a NAK to the sender 14. Since the low flag is set to six and the high flag is set to eight, a range NAK for message segments six to eight is transmitted to the sender 14 (step 514), thus ending the process.

Figure 6:
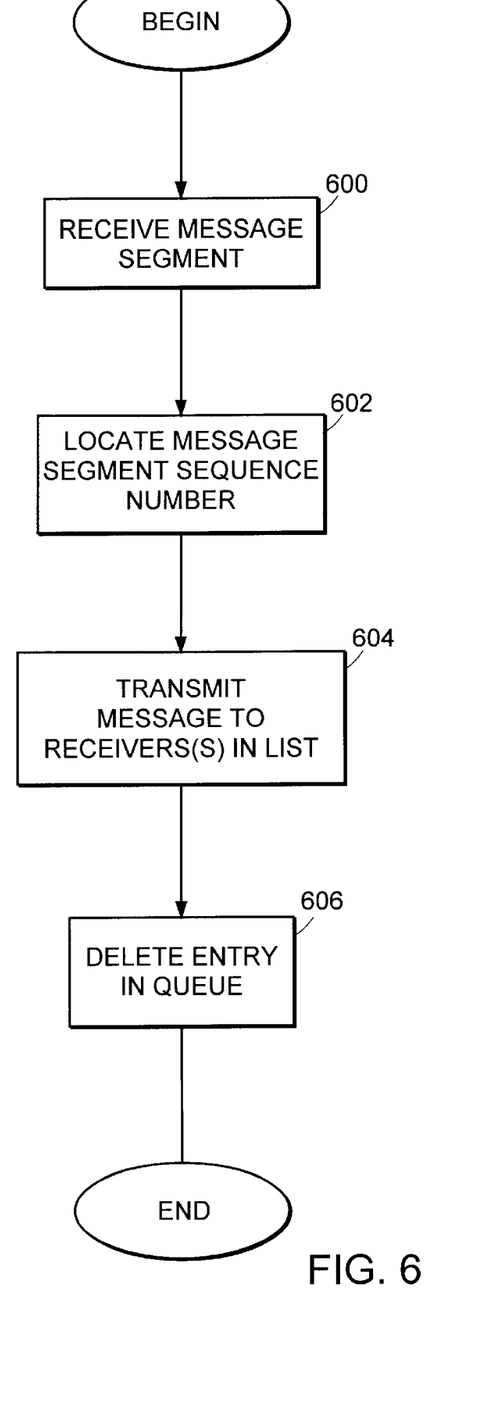
FIG. 6 shows a preferred process utilized by the network element shown in FIG. 2 for processing messages received from a sending device.

As noted above, the queue 38 formed in the memory 30 is utilized when an actual message is retransmitted from the sender 14 to the receiver 12. FIG. 6 shows a preferred process utilized by the network element 16 for processing message segments received from the sender 14. The process begins at step 600, in which a message segment is received. The message unit 40 for this message segment then is located (i.e., based upon sequence number) so that the identity of each of the requesting receivers 12 can be ascertained (step 602). The process then continues to step 604, in which the message segment is transmitted to each receiver 12 in the receiver list 48. Once transmitted, the message unit 40 for the transmitted message segment is deleted from memory 30, thus completing the process. As an example of this process, if message segment three (FIG. 4B) was received from the sender 14, then the message segment would be transmitted to receivers one, two, and three. Once transmitted, the message unit 40 is deleted from the memory 30.

Accordingly, preferred embodiments of the invention index a queue 38 based upon the sequence numbers of message segments and thus, do not index based upon NAKs. Use of this indexing method consequently produces non-overlapping range NAKs that are transmitted to the sender 14. Moreover, determining which message segments are being processed is a one to one search (i.e., a search for a given sequence number). Accordingly, processing requirements are reduced upon receipt of both message segments and confirmation messages from the sender 14, as well as upon receipt of NAKs from receivers 12.

A process similar to that shown in FIG. 6 also is executed when the network element 16 receives a confirmation message from the sender 14. In particular, upon receipt of a confirmation message for a message segment, the network element 16 determines the location of its associated message unit 40 based upon its sequence number. Accordingly, once such message unit 40 is located, the network element 16 changes the state indicator 46 to the confirmation received state. Among other things, the state indicator may be a one bit field that is set high for one state (e.g., confirmation received state), and set to be low for another state (e.g., confirmation wait state)

As suggested above, preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as preprogrammed hardware elements (e.g., application specific integrated circuits or digital signal processors), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method of requesting retransmission of at least a portion of a message from a sender, the message having a plurality of message segments, the method comprising:

receiving a retransmit message from a receiver, the retransmit message requesting retransmission of a message segment set to the receiver;

parsing the retransmit message to determine the identity of the receiver, and the identity of the message segment set requested by the receiver;

producing a message unit in memory for each message segment set that does not have an existing message unit in the memory, each message unit in the memory having data for one message segment; and adding data representing the identity of the receiver to each message unit associated with the message segment set.

2. The method as defined by claim 1 wherein each message segment is identified by an identifier, each message unit being indexed based upon the identifier of its associated message segment.

3. The method as defined by claim 1 wherein the message units in memory form a queue.

4. The method as defined by claim 1 wherein the message initially is transmitted in accord with a data transport protocol that utilizes negative acknowledgment messages.

5. The method as defined by claim 1 wherein the message segment set comprises a plurality of message segments.

6. The method as defined by claim 1 further comprising:
   determining if the sender has forwarded a confirmation message indicating its receipt of a retransmit message relating to each message segment set.

7. The method as defined by claim 6 further comprising:
   forwarding a new retransmit message to the sender if it is determined that the sender has not forwarded the confirmation message for at least one of the message segment sets, the new retransmit message including data relating to the at least one of the message segment sets.

8. The method as defined by claim 7 further comprising:
   aggregating the new retransmit message with data relating to a plurality of message segments in the message segment set.

9. The method as defined by claim 1 wherein the message is transmitted in accord with the PGM protocol.

10. An apparatus for requesting retransmission of at least a portion of a message from a sender, the message having a plurality of message segments, the apparatus comprising:
    means for receiving a retransmit message from a receiver, the retransmit message requesting retransmission of a message segment set to the receiver;
    means for parsing the retransmit message to determine the identity of the receiver, and the identity of the message segment set requested by the receiver;
    means for producing a message unit in memory for each message segment set that does not have an existing message unit in the memory, each message unit in the memory having data for one message segment; and
    means for adding data representing the identity of the receiver to each message units associated with the message segment set.

11. The apparatus as defined by claim 10 wherein each message segment is identified by an identifier, each message unit being indexed based upon the identifier of its associated message segment.

12. The apparatus as defined by claim 10 wherein the message units in memory form a queue.

13. The apparatus as defined by claim 10 wherein the message initially is transmitted in accord with a data transport protocol that utilizes negative acknowledgment messages.

14. The apparatus as defined by claim 10 wherein the message segment set comprises a plurality of message segments.

15. The apparatus as defined by claim 10 further comprising:
    means for determining if the sender has forwarded a confirmation message indicating its receipt of a retransmit message relating to each message segment set.

16. The apparatus as defined by claim 15 further comprising:
    means for forwarding a new retransmit message to the sender if it is determined that the sender has not forwarded the confirmation message for at least one message segment set, the new retransmit message including data relating to the at least one message segment set.

17. The apparatus as defined by claim 16 further comprising:
    means for aggregating the new retransmit message with data relating to a plurality of message segments in the message segment set.

18. The apparatus as defined by claim 10 wherein the message is transmitted in accord with the PGM protocol.

19. An apparatus of requesting retransmission of at least a portion of a message from a sender, the message having a plurality of message segments, the apparatus comprising:
    an input unit for receiving a retransmit message from a receiver, the retransmit message requesting retransmission of a message segment set to the receiver;
    a parser operatively coupled with the input unit, the parser parsing the retransmit message to determine the identity of the receiver, and the identity of the message segment set requested by the receiver;
    a message unit module operatively coupled with the parser, the message unit module producing a message unit in memory for each message segment set that does not have an existing message unit in the memory, each message unit in the memory having data for one message segment; and
    a data transporter operatively coupled with the message unit module, the data transporter adding data representing the identity of the receiver to each message unit associated with the message segment set.

20. The apparatus as defined by claim 19 wherein each message segment is identified by an identifier, each message unit being indexed based upon the identifier of its associated message segment.

21. The apparatus as defined by claim 19 wherein the message units in memory form a queue.

22. The apparatus as defined by claim 19 wherein the message is transmitted in accord with a data transport protocol that utilizes negative acknowledgment messages.

23. The apparatus as defined by claim 19 wherein the message segment set comprises a plurality of message segments.

24. The apparatus as defined by claim 19 further comprising:
    confirmation logic for determining if the sender has forwarded a confirmation message indicating its receipt of a retransmit message relating to each message segment set.

25. The apparatus as defined by claim 24 further comprising:
    an output unit for forwarding a new retransmit message to the sender if it is determined that the sender has not forwarded the confirmation message for at least one message segment set, the new retransmit message including data relating to the at least one message segment set.

26. The apparatus as defined by claim 25 further comprising:
    a message aggregator operatively coupled with the output unit, the message aggregator aggregating the new retransmit message with data relating to a plurality of message segments in the message segment set.

27. The apparatus as defined by claim 19 wherein the message is transmitted in accord with the PGM protocol.

28. A computer program product for use on a computer system for requesting retransmission of at least a portion of a message from a sender, the message having a plurality of message segments, the computer program product comprising a computer usable medium having computer readable program code thereon, the computer readable program code including:

program code for receiving a retransmit message from a receiver, the retransmit message requesting retransmission of a message segment set to the receiver;

program code for parsing the retransmit message to determine the identity of the receiver, and the identity of the message segment set requested by the receiver;

program code for producing a message unit in memory for each message segment set that does not have an existing message unit in the memory, each message unit in the memory having data for one message segment; and program code for adding data representing the identity of the receiver to each message unit associated with the message segment set.

29. The computer program product as defined by claim 28 wherein each message segment is identified by an identifier, each message unit being indexed based upon the identifier of its associated message segment.

30. The computer program product as defined by claim 28 wherein the message units in memory form a queue.

31. The computer program product as defined by claim 28 wherein the message is transmitted in accord with a data transport protocol that utilizes negative acknowledgment messages.

32. The computer program product as defined by claim 28 wherein the message segment set comprises a plurality of message segments.

33. The computer program product as defined by claim 28 further comprising:

program code for determining if the sender has forwarded a confirmation message indicating its receipt of a retransmit message relating to each message segment set.

34. The computer program product as defined by claim 33 further comprising:

program code for forwarding a new retransmit message to the sender if it is determined that the sender has not forwarded the confirmation message for at least one message segment set, the new retransmit message including data relating to the at least one message segment set.

35. The computer program product as defined by claim 34 further comprising:

program code for aggregating the new retransmit message with data relating to a plurality of message segments in the message segment set.

36. The computer program product as defined by claim 28 wherein the message is transmitted in accord with the PGM protocol.

37. A method of requesting retransmission of at least a portion of a message having a plurality of message segments, each message segment having a sequence identifier, the message initially being transmitted toward a receiver by a sender via an acknowledgment data transport protocol that requests retransmission of message segments, the method comprising:

receiving a retransmit message from the receiver, the retransmit message requesting retransmission of a plurality of message segments;

segmenting the retransmit message to add message segment data to a plurality of message units, each message unit including data for no more than one of the plurality of message segments; and indexing the message units based upon the sequence identifiers, the message units being accessible by their sequence identifiers.

38. The method as defined by claim 37 further comprising:

storing the identity of the receiver in each of the plurality of message units.

39. The method as defined by claim 37 wherein the retransmit message is segmented to produce a message unit for each of the plurality of message segments that does not have an existing message unit.

40. The method as defined by claim 37 wherein the message units form a queue indexed upon the sequence identifiers.

41. The method as defined by claim 37 further comprising:

accessing a message unit having data relating to a message segment; and determining if the sender has forwarded a confirmation message indicating its receipt of a retransmit message relating to the message segment.

42. The method as defined by claim 41 further comprising:

forwarding a new retransmit message to the sender if it is determined that the sender has not forwarded the confirmation message, the new retransmit message requesting retransmission of the message segment.

43. The method as defined by claim 37 wherein the message is transmitted in accord with the PGM protocol.

44. An apparatus of requesting retransmission of at least a portion of a message having a plurality of message segments, each message segment having a sequence identifier, the message initially being transmitted toward a receiver by a sender via an acknowledgment data transport protocol that requests retransmission of message segments, the apparatus comprising:

an input unit for receiving a retransmit message from the receiver, the retransmit message requesting retransmission of a plurality of message segments;

a data transporter operatively coupled with the input unit, the data transporter segmenting the retransmit message to add message segment data to a plurality of message units, each message unit including data for no more than one of the plurality of message segments; and an index module operatively that indexes the message units based upon the sequence identifiers, the message units being accessible by their sequence identifiers.

45. The apparatus as defined by claim 44 further comprising:

memory for storing the identity of the receiver in each of the plurality of message units.

46. The apparatus as defined by claim 44 wherein the retransmit message is segmented to produce a message unit for each of the plurality of message segments that does not have an existing message unit.

47. The apparatus as defined by claim 44 wherein the message units form a queue indexed upon the sequence identifiers.

48. The apparatus as defined by claim 44 further comprising:

means for accessing a message unit having data relating to a message segment; and means for determining if the sender has forwarded a confirmation message indicating its receipt of a retransmit message relating to the message segment.

49. The apparatus as defined by claim 48 further comprising:

an output unit for forwarding a new retransmit message to the sender if it is determined that the sender has not forwarded the confirmation message, the new retransmit message requesting retransmission of the message segment.

50. The apparatus as defined by claim 44 wherein the message is transmitted in accord with the PGM protocol.

51. A computer program product for use on a computer system for requesting retransmission of at least a portion of a message having a plurality of message segments, each message segment having a sequence identifier, the message initially being transmitted toward a receiver by a sender via an acknowledgment data transport protocol that requests retransmission of message segments, the computer program product comprising a computer usable medium having computer readable program code thereon, the computer readable program code including:

program code for receiving a retransmit message from the receiver, the retransmit message requesting retransmission of a plurality of message segments;

program code for segmenting the retransmit message to add message segment data to a plurality of message units, each message unit including data for no more than one of the plurality of message segments; and program code for indexing the message units based upon the sequence identifiers, the message units being accessible by their sequence identifiers.

52. The computer program product as defined by claim 51 further comprising:

program code for storing the identity of the receiver in each of the plurality of message units.

53. The computer program product as defined by claim 51 wherein the retransmit message is segmented to produce a message unit for each of the plurality of message segments that does not have an existing message unit.

54. The computer program product as defined by claim 51 wherein the message units form a queue indexed upon the sequence identifiers.

55. The computer program product as defined by claim 51 further comprising:

program code for accessing a message unit having data relating to a message segment; and program code for determining if the sender has forwarded a confirmation message indicating its receipt of a retransmit message relating to the message segment.

56. The computer program product as defined by claim 55 further comprising:

program code for forwarding a new retransmit message to the sender if it is determined that the sender has not forwarded the confirmation message, the new retransmit message requesting retransmission of the message segment.

57. The computer program product as defined by claim 51 wherein the message is transmitted in accord with the PGM protocol.

58. A method of requesting retransmission of at least a portion of a message having a plurality of message segments, the message initially being transmitted toward a receiver by a sender via an acknowledgment data transport protocol that requests retransmission of message segments, the method comprising:

receiving a retransmit message from the receiver, the retransmit message requesting retransmission of a set of message segments;

accessing a set of message units relating to the set of message segments, each message unit in the set of message units including data for no more than one of the set of message segments;

producing a message unit for each message segment in the set of message segments that does tot have an existing message unit in the set of message units, all of the message segments being in a memory device;

generating a new retransmit message based upon the data in the message units in the memory device, the new retransmit message including a request to retransmit a plurality of the message segments in the set of message segments; and forwarding the new retransmit message to the sender.

59. The method as defined by claim 58 wherein the act of generating comprises:

accessing each message unit to determine if the sender forwarded at least one confirmation message, the confirmation message for a message unit indicating receipt by the sender of a retransmit message relating to the message segment associated with the message unit; and adding identification data to the new retransmit message, the identification data identifying each message segment with an associated message unit that does not have confirmation received data, the confirmation received data being in each message unit that received a confirmation message.

60. The method as defined by claim 58 further comprising:

storing the identity of the receiver in the set of message units.

61. An apparatus for requesting retransmission of at least a portion of a message having a plurality of message segments, the message initially being transmitted toward a receiver by a sender via an acknowledgment data transport protocol that requests retransmission of message segments, the apparatus comprising:

an input unit for receiving a retransmit message from the receiver, the retransmit message requesting retransmission of a set of message segments;

an accessor operatively coupled with the input unit, the accessor accessing a set of message units relating to the set of message segments, each message unit in the set of message units including data for no more than one of the set of message segments;

a message unit module operatively coupled with the accessor, the message unit module producing a message unit for each message segment in the set of message segments that does not have an existing message unit in the set of message units, all of the message segments being in a memory device;

a message unit generator operatively coupled with the message unit module, the message unit generator generating a new retransmit message based upon the data in the message units in the memory device, the new retransmit message including a request to retransmit a plurality of the message segments in the set of message segments; and an output unit for forwarding the new retransmit message to the sender.

62. The apparatus as defined by claim 61 wherein the message unit generator comprises:

means for accessing each message unit to determine if the sender forwarded at least one confirmation message, the confirmation message for a message unit indicating receipt by the sender of a retransmit message relating to the message segment associated with the message unit; and means for adding identification data to the new retransmit message, the identification data identifying each message segment with an associated message unit that does not have confirmation received data, the confirmation received data being in each message unit that received a confirmation message.

63. The apparatus as defined by claim 61 further comprising:

memory for storing the identity of the receiver in the set of message units.

64. A computer program product for use on a computer system for requesting retransmission of at least a portion of a message having a plurality of message segments, the message initially being transmitted toward a receiver by a sender via an acknowledgment data transport protocol that requests retransmission of message segments, the computer program product comprising a computer usable medium having computer readable program code thereon, the computer readable program code including:

program code for receiving a retransmit message from the receiver, the retransmit message requesting retransmission of a set of message segments;

program code for accessing a set of message units relating to the set of message segments, each message unit in the set of message units including data for no more than one of the set of message segments;

program code for producing a message unit for each message segment in the set of message segments that does not have an existing message unit in the set of message units, all of the message segments being in a memory device;

program code for generating a new retransmit message based upon the data in the message units in the memory device, the new retransmit message including a request to retransmit a plurality of the message segments in the set of message segments; and program code for forwarding the new retransmit message to the sender.

65. The computer program product as defined by claim 64 wherein the act of generating comprises:

program code accessing each message unit to determine if the sender forwarded at least one confirmation message, the confirmation message for a message unit indicating receipt by the sender of a retransmit message relating to the message segment associated with the message unit; and program code for adding identification data to the new retransmit message, the identification data identifying each message segment with an associated message unit that does not have confirmation received data, the confirmation received data being in each message unit that received a confirmation message.

66. The computer program product as defined by claim 64 further comprising:

program code for storing the identity of the receiver in the set of message units.

* * * * *